United States Patent
Sato (10) Patent No.: US 10,213,916 B2
(45) Date of Patent: Feb. 26, 2019

(54) CONTROL APPARATUS AND ROBOT SYSTEM

(71) Applicant: Seiko Epson Corporation, Tokyo (JP)

(72) Inventor: Daisuke Sato, Matsumoto (JP)

(73) Assignee: Seiko Epson Corporation (JP)

( * ) Notice: Subject to any disclaimer, the term of this patent is extended or adjusted under 35 U.S.C. 154(b) by 148 days.

(21) Appl. No.: 15/463,255

(22) Filed: Mar. 20, 2017

(65) Prior Publication Data

US 2017/0274523 A1 Sep. 28, 2017

(30) Foreign Application Priority Data

Mar. 23, 2016 (JP) ................................ 2016-058113
Oct. 3, 2016 (JP) ................................ 2016-195451

(51) Int. Cl.
 *G06F 19/00* (2018.01)
 *B25J 9/00* (2006.01)
 *B25J 9/16* (2006.01)

(52) U.S. Cl.
 CPC ........... *B25J 9/0084* (2013.01); *B25J 9/1651* (2013.01); *B25J 9/1676* (2013.01); *B25J 9/1694* (2013.01); *G05B 2219/40202* (2013.01); *G05B 2219/40476* (2013.01)

(58) Field of Classification Search
 CPC ...... B25J 9/0084; B25J 9/1651; B25J 9/1676; B25J 9/1694; G05B 2219/40202; G05B 2219/40476
 USPC ................................................. 700/248, 245
 See application file for complete search history.

(56) References Cited

U.S. PATENT DOCUMENTS

| 5,737,500 | A | * | 4/1998 | Seraji | ..................... B25J 9/1643 318/568.11 |
|---|---|---|---|---|---|
| 9,333,042 | B2 | * | 5/2016 | Diolaiti | ................. A61B 90/37 |
| 9,516,996 | B2 | * | 12/2016 | Diolaiti | ............. A61B 1/00009 |
| 2005/0113973 | A1 | * | 5/2005 | Endo | ....................... B25J 9/161 700/245 |
| 2005/0166413 | A1 | * | 8/2005 | Crampton | ............. B25J 13/088 33/503 |
| 2013/0325029 | A1 | * | 12/2013 | Hourtash | ............... B25J 9/1607 606/130 |

(Continued)

FOREIGN PATENT DOCUMENTS

| JP | 2010-208002 A | 9/2010 |
|---|---|---|
| JP | 2012-250314 A | 12/2012 |

(Continued)

*Primary Examiner* — Ronnie M Mancho
(74) *Attorney, Agent, or Firm* — Harness, Dickey & Pierce, P.L.C.

(57) ABSTRACT

A control apparatus is a control apparatus that controls a first manipulator including a detection acquisition unit that acquires information from a first detection unit detecting that at least one of a living organism and an object is located within a first range, a velocity acquisition unit that acquires a velocity of a second manipulator different from the first manipulator, and a control unit that controls a velocity of the first manipulator to be equal to or less than a first velocity, wherein the control unit controls the velocity of the first manipulator so that a relative velocity between the first manipulator and the second manipulator may be equal to or less than a second velocity when the detection acquisition unit acquires the information.

20 Claims, 6 Drawing Sheets

(56) References Cited

U.S. PATENT DOCUMENTS

2013/0325030 A1* 12/2013 Hourtash ............... B25J 9/1607
                                                                606/130

FOREIGN PATENT DOCUMENTS

| JP | 2013-111718 A | 6/2013 |
| JP | 2015-150673 A | 8/2015 |

* cited by examiner

CONTROL APPARATUS AND ROBOT SYSTEM

BACKGROUND

1. Technical Field

The present invention relates to a robot control apparatus and a robot system.

2. Related Art

In related art, for coexistence with humans, functional safety robots that control velocities of movable parts (not limited to hand tips) to be equal to or less than a safe velocity (e.g. 250 mm/s) are proposed (for example, see Patent Document 1 (JP-A-2010-208002)).

However, in Patent Document 1, in the case where movable parts (hereinafter, manipulators) of a plurality of functional safety robots are placed closer to each other almost in contact or with slight gaps, even when the respective manipulators move at the safe velocity or less, the relative velocity between the manipulators may be twice. It is possible that a living organism and an object are caught between the plurality of manipulators.

The risk is further increased in the case where it is caught by the plurality of manipulators with less room to avoid than in the case where it collides with one manipulator. Further, the risk is particularly increased in the case where it collides with the plurality of manipulators at the same time.

SUMMARY

An advantage of some aspects of the invention is to solve at least a part of the problems described above, and the invention can be implemented as the following forms or application examples.

Application Example 1

A control apparatus according to this application example is a control apparatus that controls a first manipulator, including a detection acquisition unit that acquires information from a first detection unit detecting that at least one of a living organism and an object is located within a first range, a velocity acquisition unit that acquires a velocity of a second manipulator different from the first manipulator, and a control unit that controls a velocity of the first manipulator to be equal to or less than a first velocity, wherein the control unit controls the velocity of the first manipulator so that a relative velocity between the first manipulator and the second manipulator may be equal to or less than a second velocity when the detection acquisition unit acquires the information.

According to this application example, the velocity of the first manipulator is controlled and the relative velocity between the first manipulator and the second manipulator may be made equal to or less than the second velocity. Thereby, the control apparatus that may reduce an impact due to collisions to a safe level even when at least one of a living organism and an object is caught between the first manipulator and the second manipulator may be provided.

Here, the living organism includes e.g. a human or an animal such as a dog or cat, not the human.

Application Example 2

In the control apparatus according to the application example, it is preferable that the respective velocities of the first manipulator and the second manipulator are velocities at which the first manipulator and the second manipulator move in directions closer to each other.

According to this application example, the relative velocity at which the respective manipulators move in the directions closer to each other may be made equal to or less than the second velocity, and, even in the case of being caught by the plurality of manipulators, an impact due to collisions may be reduced to a safe level.

Application Example 3

In the control apparatus according to the application example, it is preferable that the control unit controls a velocity of a distal end of the first manipulator so that a relative velocity between the distal end of the first manipulator and a distal end of the second manipulator may be equal to or less than the second velocity when the detection acquisition unit acquires the information.

According to this application example, the velocity of the first manipulator is controlled, and the relative velocity between the distal end of the first manipulator and the distal end of the second manipulator may be made equal to or less than the second velocity.

Here, when an end effector is provided on the manipulator, the distal end of the manipulator refers to the distal end of the end effector.

Application Example 4

In the control apparatus according to the application example, a position acquisition unit that acquires a position of the second manipulator is provided, and it is preferable that the control unit controls a velocity of a distal end of the first manipulator so that a relative velocity between the distal end of the first manipulator and a distal end of the second manipulator may be equal to or less than the second velocity when the detection acquisition unit acquires the information and a distance between the distal end of the first manipulator and the distal end of the second manipulator is equal to or less than a first distance.

According to this application example, when the distance between the distal end of the first manipulator and the distal end of the second manipulator is equal to or less than the first distance, the velocity of the first manipulator is controlled, and the relative velocity between the distal end of the first manipulator and the distal end of the second manipulator may be made equal to or less than the second velocity.

Application Example 5

In the control apparatus according to the application example, it is preferable that the first manipulator has a joint, the second manipulator has a joint, and the control unit controls a velocity of the joint of the first manipulator so that a relative velocity between the joint of the first manipulator and the joint of the second manipulator may be equal to or less than the second velocity when the detection acquisition unit acquires the information.

According to this application example, the velocity of the first manipulator is controlled, and the relative velocity between the joint of the first manipulator and the joint of the second manipulator may be made equal to or less than the second velocity.

Application Example 6

In the control apparatus according to the application example, it is preferable that the first manipulator has a plurality of joints, the second manipulator has a plurality of joints, and, when a distance between one first joint of the plurality of joints of the first manipulator and one second joint of the plurality of joints of the second manipulator is equal to or less than a first distance, the control unit controls a velocity of the first joint so that a relative velocity between the first joint and the second joint may be equal to or less than the second velocity.

According to this application example, the velocity of the first manipulator is controlled, and the relative velocity between one first joint of the plurality of joints of the first manipulator and one second joint of the plurality of joints of the second manipulator may be made equal to or less than the second velocity.

Application Example 7

In the control apparatus according to the application example, it is preferable that the control unit reduces a velocity of another joint than the one first joint of the plurality of joints of the first manipulator when the distance between the first joint and the second joint is equal to or less than the first distance.

According to this application example, the velocity of the other joint than one first joint of the plurality of joints of the first manipulator may be reduced when the distance between one first joint of the plurality of joints of the first manipulator and one second joint of the plurality of joints of the second manipulator is equal to or less than the first distance.

Application Example 8

In the control apparatus according to the application example, it is preferable that the first range contains a movable range of the first manipulator.

According to this application example, the first range contains the movable range of the first manipulator, and an impact due to a collision may be reduced to a safe level.

Application Example 9

In the control apparatus according to the application example, it is preferable that the first range contains a movable range of the first manipulator and a movable range of the second manipulator.

According to this application example, the first range contains the movable range of the first manipulator and the movable range of the second manipulator, and an impact due to collisions may be reduced to a safe level.

Application Example 10

In the control apparatus according to the application example, it is preferable that the first velocity is equal to the second velocity.

According to this application example, stable operations may be performed.

Application Example 11

In the control apparatus according to the application example, it is preferable that the first velocity and the second velocity are 250 mm/s.

According to this application example, the relative velocity between the manipulators close to each other may be controlled to be equal to or less than the safe velocity (250 mm/s).

For example, as specified in ISO 10218-1, the safe velocity is a velocity within 250 mm/sec as an upper limit of the velocity at which industrial robots and humans can coexist and determined according to a previous risk assessment or the like.

Application Example 12

In the control apparatus according to the application example, it is preferable that the control unit controls the first manipulator and the second manipulator.

According to this application example, a grasp pattern in which both of the manipulators can grasp something at the same time is selected, and a grasping method that does not cause a failure of the next operation or the like can be determined. Note that the number of manipulators may be three or more.

A robot system according to this application example includes the control apparatus according to any one of the application examples and a robot controlled by the control apparatus.

According to this application example, the control apparatus according to anyone of the application examples and the robot controlled by the control apparatus are provided, and the velocity of the first manipulator is controlled and the relative velocity between the first manipulator and the second manipulator may be made equal to or less than the second velocity. Thereby, the robot system that may reduce an impact due to collisions to a safe level even when at least one of a living organism and an object is caught between the first manipulator and the second manipulator may be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, embodiments of the invention will be explained with reference to the drawings. Note that, in the drawings for use, the parts to be explained are appropriately enlarged or reduced for recognition.

First Embodiment

In a robot system of the embodiment, movable parts (hereinafter, manipulators) of a plurality of robots are placed closer to each other almost in contact or with slight gaps.

Figure 1:
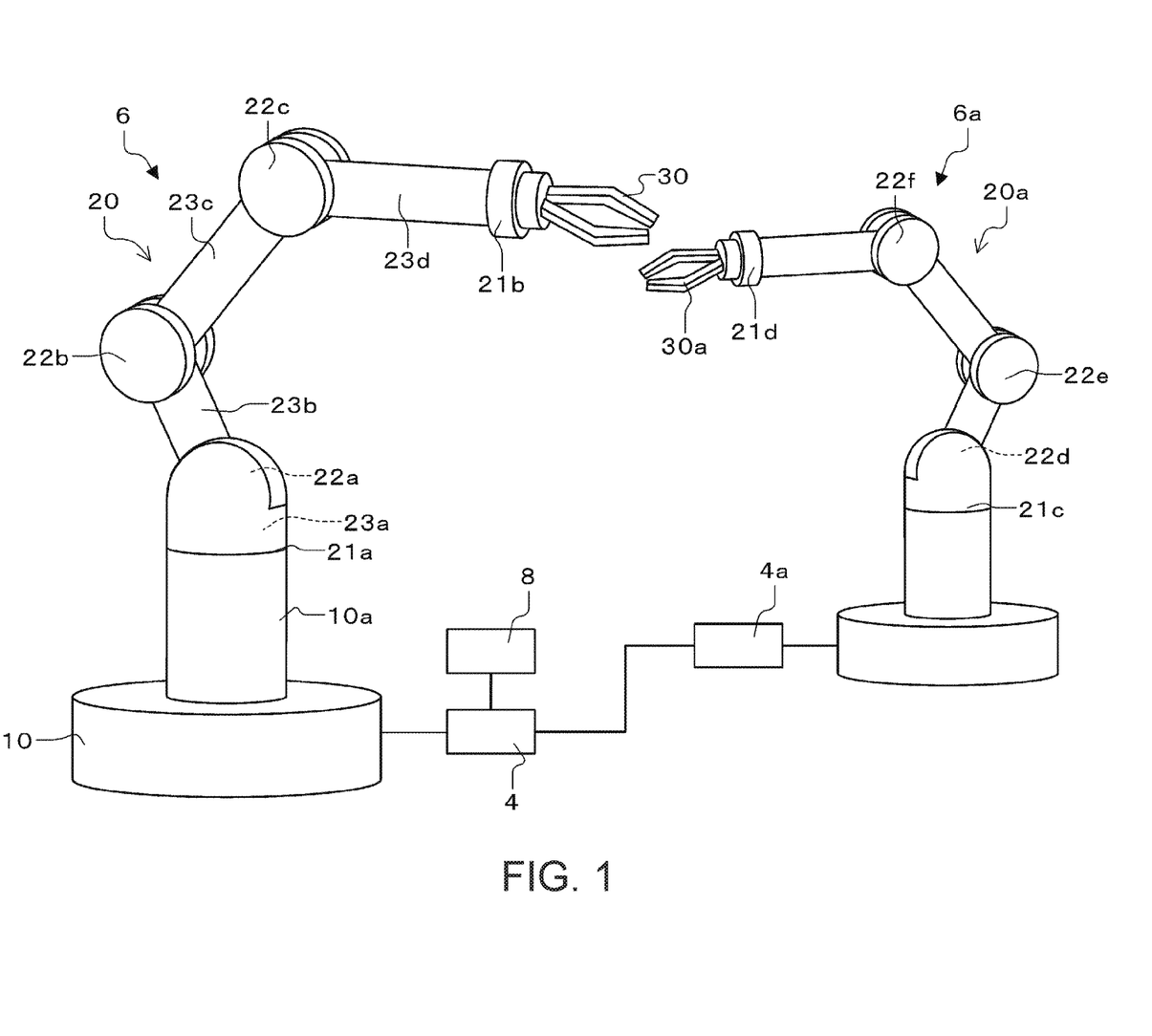
FIG. 1 is a configuration diagram showing a configuration of a robot system according to the first embodiment.

FIG. 1 is a configuration diagram showing a configuration of the robot system according to the embodiment.

The robot system according to the embodiment includes a first control apparatus 4 as a control apparatus, a first robot 6 as a robot controlled by the first control apparatus 4, a human entry sensor 8 as a first detection unit, a second control apparatus 4a, and a second robot 6a controlled by the second control apparatus 4a. Note that the structure of the second robot 6a is the same as the structure of the first robot 6, and the structure of the first robot 6 will be explained and the explanation will be omitted.

As shown in FIG. 1, the first robot 6 according to the embodiment includes a first manipulator 20 fixed to a base 10, and a first end effector 30 provided on the distal end side of the first manipulator 20.

The base 10 has a function of housing motors 44 (see FIG. 2) that generate power for rotating the first manipulator 20, the first control apparatus 4 that controls the motors 44, etc. Further, for example, the base 10 is fixed onto a floor, wall, ceiling, and movable platform.

The first manipulator 20 connects a base shaft 10a and arms 23a, 23b, 23c, 23d using shaft rotation joints 21a, 21b as joints and plane rotation joints 22a, 22b, 22c as joints, and has a degree of freedom of five. The shaft rotation joints 21a, 21b rotate in both directions about the arms and the plane rotation joints 22a, 22b, 22c rotate the connected arms relatively in both directions.

Figure 2:
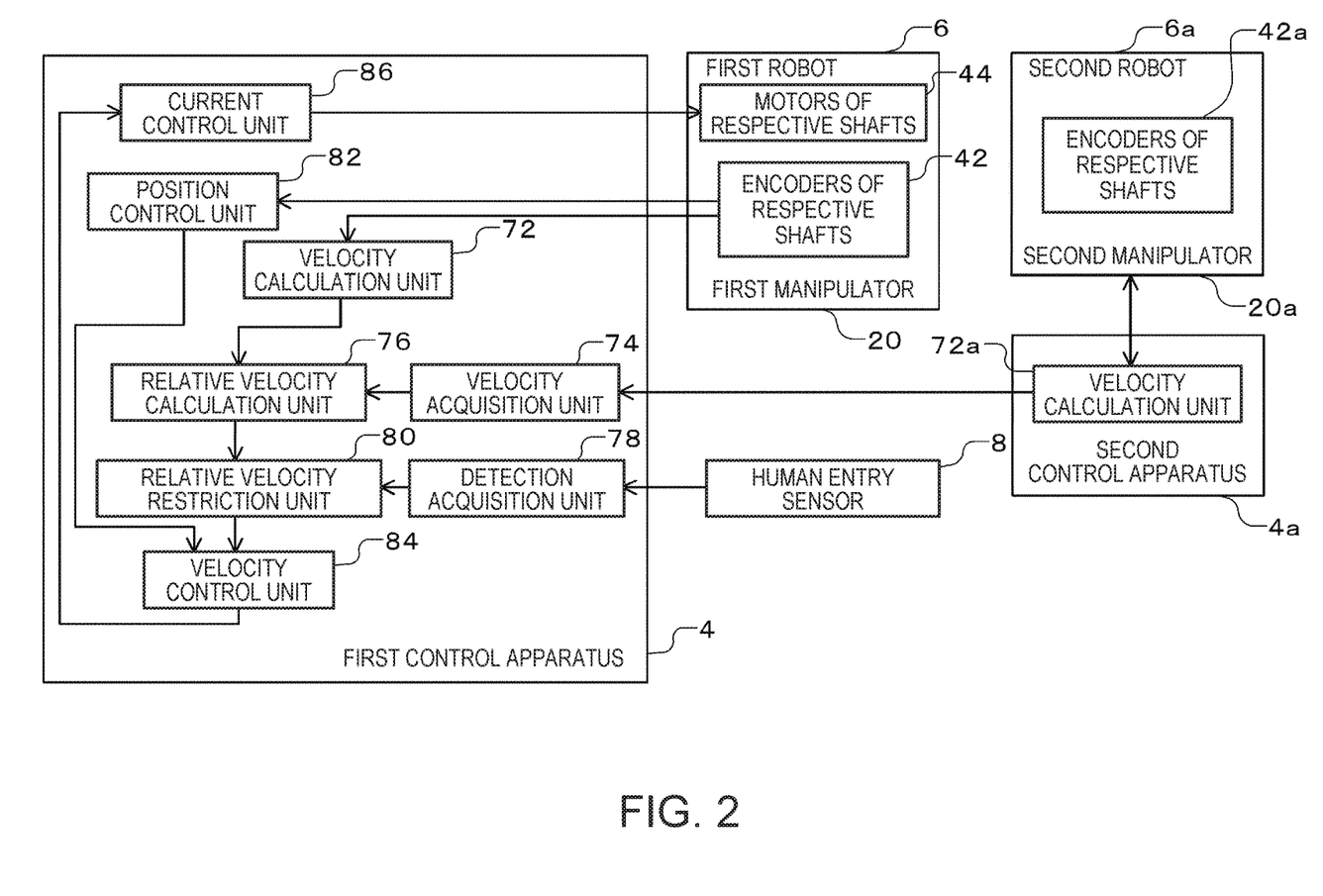
FIG. 2 is a block diagram showing the robot system according to the first embodiment.

The first robot 6 includes the motors 44 of the respective shafts and encoders 42 of the respective shafts (see FIG. 2). The encoders 42 of the respective shafts acquire angles and velocities of the respective joints. The encoders may be duplexed.

The first end effector 30 includes a first finger and a second finger. The first end effector 30 reaches a predetermined operation position by the driving of the first manipulator 20, then, adjusts the separation distance between the first finger and the second finger, and thereby, may grasp an object. The first end effector 30 has a function of grasping an object.

Note that the first end effector 30 is a hand here, however, not limited to that in the embodiment. Other examples of the end effector includes e.g. apart inspection instrument, a part carrying instrument, a part processing instrument, a part assembly instrument, and a measuring instrument.

Note that, in the illustrated configuration, the first manipulator 20 includes four arms in total, however, the embodiment is not limited to that. The cases where the first manipulator 20 includes a single arm, two to four arms, and six or more arms fall within the scope of the embodiment.

The distances between the first robot 6 and the second robot 6a and the respective bases 10 are known. Further, the distances between the respective joints of the respective first and second first manipulators 20, 20a are also known.

The human entry sensor 8 senses that a human is present within or close to the movable range of the first robot 6.

FIG. 2 is a block diagram showing the robot system according to the embodiment.

The first control apparatus 4 of the embodiment includes a velocity calculation unit 72, a velocity acquisition unit 74, a relative velocity calculation unit 76, a detection acquisition unit 78, a relative velocity restriction unit 80, a position control unit 82, a velocity control unit 84 as a control unit, and a current control unit 86.

The velocity calculation unit 72 calculates velocities and directions of the respective shaft rotation joints 21a, 21b and the respective plane rotation joints 22a, 22b, 22c and the distal end of the first end effector 30 from angles and velocities of the respective shaft rotation joints 21a, 21b and the respective plane rotation joints 22a, 22b, 22c of the first manipulator 20 input from the encoders 42 of the respective shafts.

The velocity acquisition unit 74 acquires velocities and directions of the respective shaft rotation joints 21c, 21d and the respective plane rotation joints 22d, 22e, 22f and a distal end of a second end effector 30a of the second manipulator 20a.

The relative velocity calculation unit 76 calculates relative velocities between the respective shaft rotation joints 21a, 21b and the respective plane rotation joints 22a, 22b, 22c and the distal end of the first end effector 30 of the first manipulator 20 and the respective shaft rotation joints 21c, 21d and the respective plane rotation joints 22d, 22e, 22f and the distal end of the second end effector 30a of the second manipulator 20a.

The detection acquisition unit 78 acquires information from the human entry sensor 8 that detects that at least one of a living organism and an object is located within a first range. Here, the living organism refers to e.g. a human or an animal such as a dog or cat, not the human.

It is preferable that the first range contains a movable range of the first manipulator 20. The first range contains the movable range of the first manipulator 20, and thereby, an impact due to a collision may be reduced to a safe level.

It is preferable that the first range contains the movable range of the first manipulator 20 and the movable range of the second manipulator 20a. The first range contains the movable range of the first manipulator and the movable range of the second manipulator, and thereby, an impact due to collisions may be reduced to a safe level.

The relative velocity restriction unit 80 restricts a joint velocity command of the first manipulator 20 so that the relative velocity may be equal to or less than a restricted value. The relative velocity restriction unit 80 may increase the priority of a particular manipulator so that the velocity restriction may be harder compared to the other manipulators (having lower priorities).

Further, the relative velocity restriction unit 80 may decelerate the other joints in conjunction with the joint at the restricted velocity. Thereby, the shift of the trajectory of the hand tip due to simple restriction of the velocity of a certain joint may be suppressed. Therefore, the trackability on the trajectory of the hand tip is improved.

Furthermore, in the case of a seven-axis robot having a redundant degree of freedom or the like, if a joint has a restricted velocity, the relative velocity restriction unit 80 may maintain the trackability on the trajectory of the hand tip by adjusting the angles and velocities of the other joints. Thereby, a delay of time for the hand tip to reach a target position may be suppressed.

Note that the relative velocity restriction unit 80 may restrict the relative velocities only when a human is present within the movable range based on the information from the human entry sensor 8, not constantly.

The position control unit 82 outputs a signal for driving the first manipulator 20 so that the first end effector 30 may move in a predetermined route based on the angles and the velocities of the shaft rotation joints 21a, 21b and the plane rotation joints 22a, 22b, 22c input from the encoders 42 of the respective shafts. The position control unit 82 outputs a signal representing velocity command values as rotation velocities of the motors 44 of the respective shafts as a joint velocity command to the velocity control unit 84.

The velocity control unit 84 allows the velocities of the shaft rotation joints 21a, 21b and the plane rotation joints 22a, 22b, 22c of the first manipulator 20 to follow the joint velocity command. The velocity control unit 84 controls the velocity of the first manipulator 20 to be equal to or less than a first velocity. The velocity control unit 84 controls the velocity of the first manipulator 20 so that the relative velocity between the first manipulator 20 and the second manipulator 20a may be equal to or less than a second velocity when the detection acquisition unit 78 acquires the information from the human entry sensor 8.

It is preferable that the first velocity is equal to the second velocity. Thereby, stable operations may be performed.

It is preferable that the first velocity and the second velocity are 250 mm/s. Thereby, the relative velocity between the first and second manipulators 20, 20a may be controlled to be equal to or less than a safe speed (250 mm/s).

For example, as specified in ISO 10218-1, the safe velocity is a velocity within 250 mm/sec as an upper limit at which industrial robots and humans can coexist and determined according to a previous risk assessment or the like.

Figure 3:
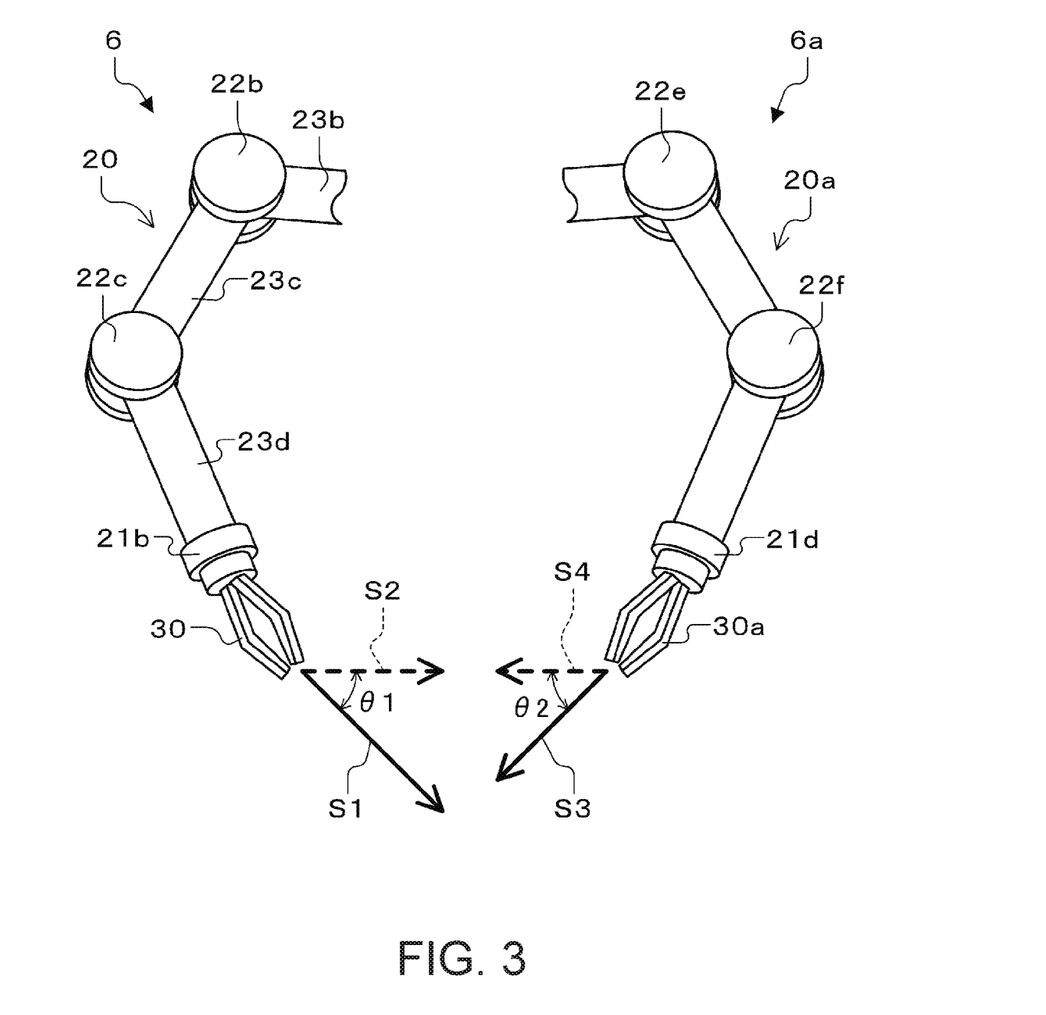
FIG. 3 is a diagram for explanation of a safe velocity in the case of collisions with a plurality of manipulators according to the first embodiment.

FIG. 3 is a diagram for explanation of the safe velocity in the case of collisions with a plurality of manipulators according to the embodiment.

For example, the risk is further increased in the case of being caught by the first manipulator 20 and the second manipulator 20a with less room to avoid than in the case of colliding with the first manipulator 20 or the second manipulator 20a. Further, the risk is particularly increased in the case of colliding with the first manipulator 20 and the second manipulator 20a at the same time.

However, in the embodiment, the respective velocities of the first manipulator 20 and the second manipulator 20a are velocities at which the first manipulator 20 and the second manipulator 20a move in directions closer to each other. Thereby, the relative velocity at which the respective manipulators 20, 20a move in the directions closer to each other may be made equal to or less than the second velocity, and, even in the case of being caught by the first and second manipulators 20, 20a, an impact due to collisions may be reduced to a safe level.

The first manipulator 20 and the second manipulator 20a move closer to each other from oblique directions. For example, as shown in FIG. 3, let a velocity vector in a first direction in which the first manipulator 20 moves be a first velocity vector S1. Let an angle between the direction in which the first manipulator 20 moves and the direction in which the first manipulator 20 moves closer to the second manipulator 20a be a first angle θ1. Let a velocity vector projected in the direction in which the first manipulator 20 moves closer to the second manipulator 20a be a second velocity vector S2. The second velocity vector S2 is a velocity vector in which the first manipulator 20 moves closer to the second manipulator 20a, and S2=S1·cos θ1. The velocity control unit 84 controls the velocity of the second velocity vector S2 to be equal to or less than the first velocity.

Further, let a velocity vector in a second direction in which the second manipulator 20a moves be a third velocity vector S3. Let an angle between the direction in which the second manipulator 20a moves and the direction in which the second manipulator 20a moves closer to the first manipulator 20 be a second angle θ2. Let a velocity vector projected in the direction in which the second manipulator 20a moves closer to the first manipulator 20 be a fourth velocity vector S4. The fourth velocity vector S4 is a velocity vector in which the second manipulator 20a moves closer to the first manipulator 20, and S4=S3·cos θ2.

The velocity control unit 84 controls the first velocity vector S1 of the first manipulator 20 so that the relative velocity between the second velocity vector S2 and the fourth velocity vector S4 may be equal to or less than the second velocity when the detection acquisition unit 78 acquires the information from the human entry sensor 8. Thereby, the relative velocity |S2−S4| between the velocities at which the first manipulator 20 and the second manipulator 20a move closer to each other is reduced to the second velocity or less at the safe level (the safe velocity or less).

It is preferable that the velocity control unit 84 controls the velocity of the distal end of the first end effector 30 so that the relative velocity between the distal end of the first end effector 30 and the distal end of the second end effector 30a may be equal to or less than the second velocity when the detection acquisition unit 78 acquires the information from the human entry sensor 8. Thereby, the velocity of the first manipulator 20 is controlled, and the relative velocity between the distal end of the first end effector 30 and the distal end of the second end effector 30a may be made equal to or less than the second velocity.

Here, in the case where the first and second manipulators 20, 20a and the first and second end effectors 30, 30a are provided, the distal ends of the first and second manipulators refer to the distal ends of the first and second end effectors 30, 30a.

It is preferable that the velocity control unit 84 controls the velocities of the shaft rotation joints 21a, 21b and the plane rotation joints 22a, 22b, 22c of the first manipulator 20 so that the relative velocities between the shaft rotation joints 21a, 21b and the plane rotation joints 22a, 22b, 22c of the first manipulator 20 and the shaft rotation joints 21c, 21d and the plane rotation joints 22d, 22e, 22f of the second manipulator 20a may be equal to or less than the second velocity when the detection acquisition unit 78 acquires the information from the human entry sensor 8. Thereby, the velocity of the first manipulator 20 is controlled, and the relative velocities between the shaft rotation joints 21a, 21b and the plane rotation joints 22a, 22b, 22c of the first manipulator 20 and the shaft rotation joints 21c, 21d and the plane rotation joints 22d, 22e, 22f of the second manipulator 20a may be made equal to or less than the second velocity.

The current control unit 86 drives the motors 44 of the respective shafts by inputting a current command.

The second control apparatus 4a of the embodiment includes a velocity calculation unit 72a.

The velocity calculation unit 72a calculates velocities and directions of the respective shaft rotation joints 21c, 21d and the respective plane rotation joints 22d, 22e, 22f and the distal end of the second end effector 30a from angles and velocities of the shaft rotation joints 21c, 21d and the plane rotation joints 22d, 22e, 22f of the second manipulator 20a input from the encoders 42a of the respective shafts.

According to the embodiment, the velocity of the first manipulator 20 is controlled, and the relative velocity between the first manipulator 20 and the second manipulator 20a may be made equal to or less than the second velocity. Thereby, the control apparatus may reduce an impact due to collisions to a safe level even when at least one of a living organism and an object is caught between the first manipulator 20 and the second manipulator 20a by restricting the relative velocity between the manipulators may be provided.

According to the embodiment, the relative velocity between the first and second manipulators 20, 20a close to each other may be controlled to the safe velocity (250 mm/s) or less. Thereby, in comparison with the case where the relative velocity is not made to be equal to or less than the second velocity, the risk may be reduced and the potential of breakage of the object may be reduced. As a result, the control apparatus that may reduce an impact due to collisions even when a human is caught between the first and second manipulators 20, 20a by restricting the relative velocity between the manipulators may be provided.

According to the embodiment, the first control apparatus 4 and the first robot 6 controlled by the first control apparatus 4 are provided, and the velocity of the first manipulator 20 is controlled and the relative velocity between the first manipulator 20 and the second manipulator 20a may be made equal to or less than the second velocity. Thereby, the robot system that may reduce an impact due to collisions to a safe level even when at least one of a living organism and an object is caught between the first manipulator 20 and the second manipulator 20a may be provided.

Second Embodiment

Figure 4:
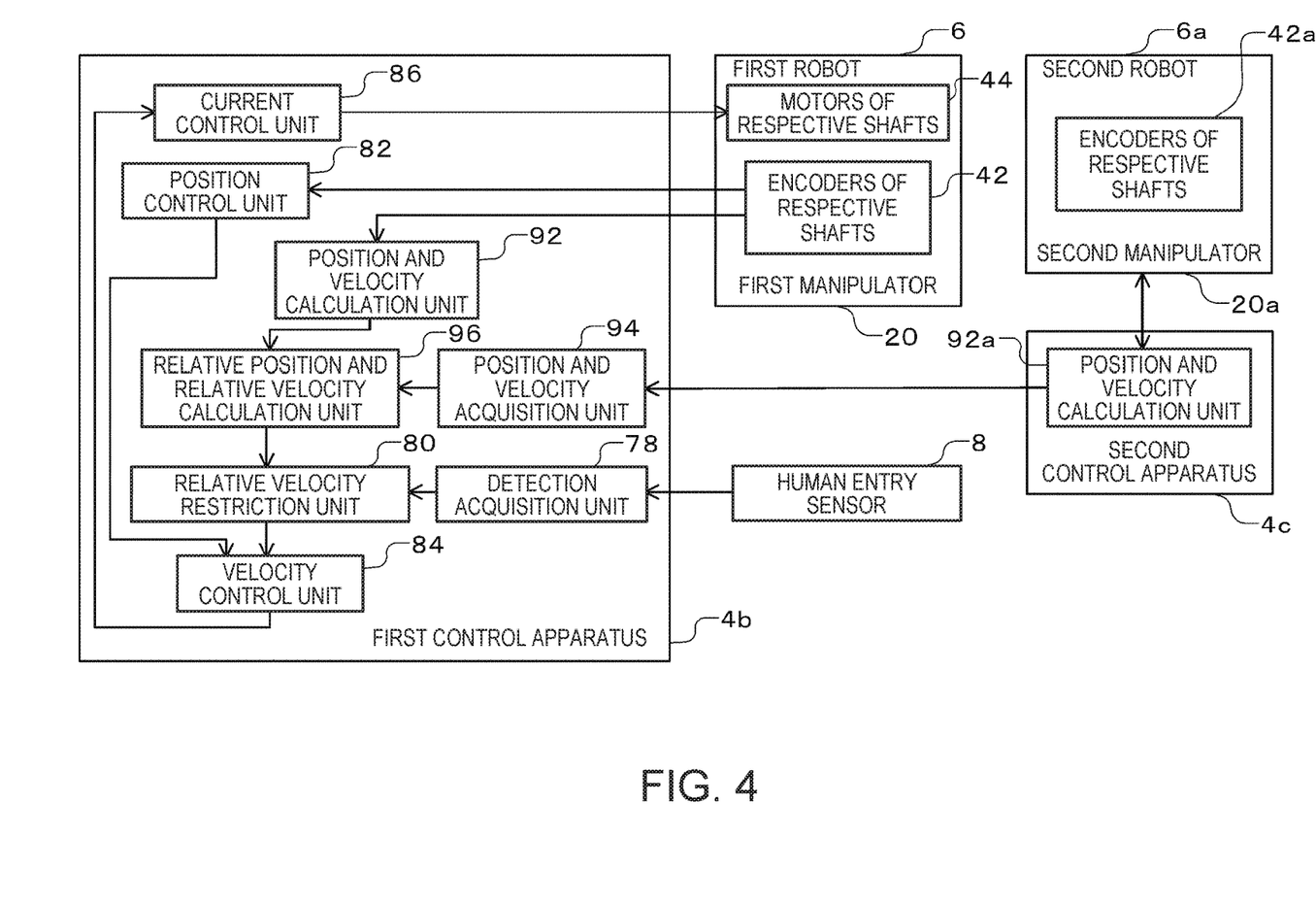
FIG. 4 is a block diagram showing a robot system according to the second embodiment.

FIG. 4 is a block diagram showing a robot system according to the embodiment. As below, the structure of the robot system will be explained with reference to FIG. 4.

The first control apparatus 4 of the first embodiment restricts the joint velocity command of the first manipulator 20 so that the relative velocity may be equal to or less than the restricted value.

A first control apparatus 4b of the embodiment is different from that of the first embodiment in that the relative velocity is restricted to be equal to or less than the restricted value when the distance between the first and second manipulators 20, 20a is small (e.g. 300 m or less), not constantly. As below, the same configurations as those of the first embodiment have the same signs and their explanation will be omitted or simplified here.

The robot system of the embodiment includes the first control apparatus 4b as a control apparatus and a second control apparatus 4c.

As shown in FIG. 4, the first control apparatus 4b includes a position and velocity calculation unit 92, a position and velocity acquisition unit 94 as a position acquisition unit, and a relative position and relative velocity calculation unit 96.

The position and velocity calculation unit 92 calculates velocities, directions, and positions of the shaft rotation joints 21a, 21b and the plane rotation joints 22a, 22b, 22c and the distal end of the first end effector 30 from angles and velocities of the shaft rotation joints 21a, 21b and the plane rotation joints 22a, 22b, 22c of the first manipulator 20.

The position and velocity acquisition unit 94 acquires velocities, directions, and positions of the respective shaft rotation joints 21c, 21d and the respective plane rotation joints 22d, 22e, 22f and the distal end of the second end effector 30a of the second manipulator 20a.

The relative position and relative velocity calculation unit 96 calculates relative velocities between the respective shaft rotation joints 21a, 21b and the respective plane rotation joints 22a, 22b, 22c and the distal end of the first end effector 30 of the first manipulator 20 and the respective shaft rotation joints 21c, 21d and the respective plane rotation joints 22d, 22e, 22f and the distal end of the second end effector 30a of the second manipulator 20a.

The relative position and relative velocity calculation unit 96 calculates distances between the respective shaft rotation joints 21a, 21b and the respective plane rotation joints 22a, 22b, 22c and the distal end of the first end effector 30 of the first manipulator 20 and the respective shaft rotation joints 21c, 21d and the respective plane rotation joints 22d, 22e, 22f and the distal end of the second end effector 30a of the second manipulator 20a.

It is preferable that the velocity control unit 84 controls the velocity of the distal end of the first end effector 30 so that the relative velocity between the distal end of the first end effector 30 and the distal end of the second end effector 30a may be equal to or less than the second velocity when the detection acquisition unit 78 acquires the information from the human entry sensor 8 and the distance between the distal end of the first end effector 30 and the distal end of the second end effector 30a is equal to or less than a first distance. Thereby, when the distance between the distal end of the first end effector 30 and the distal end of the second end effector 30a is equal to or less than the first distance, the velocity of the first manipulator 20 is controlled, and the relative velocity between the distal end of the first end effector 30 and the distal end of the second end effector 30a may be made equal to or less than the second velocity.

It is preferable that, when a distance between one first joint of the plurality of shaft rotation joints 21a, 21b and plane rotation joints 22a, 22b, 22c of the first manipulator 20 and one second joint of the plurality of shaft rotation joints 21c, 21d and plane rotation joints 22d, 22e, 22f of the second manipulator 20a is equal to or less than the first distance, the velocity control unit 84 controls the velocity of the first joint so that the relative velocity between the first joint and the second joint may be equal to or less than the second velocity. Thereby, the velocity of the first manipulator 20 is controlled, and the relative velocity between one first joint of the plurality of shaft rotation joints 21a, 21b and plane rotation joints 22a, 22b, 22c of the first manipulator 20 and one second joint of the plurality of shaft rotation joints 21c, 21d and plane rotation joints 22d, 22e, 22f of the second manipulator 20a may be made equal to or less than the second velocity.

It is preferable that the velocity control unit 84 reduces the velocity of another joint than one first joint of the plurality of shaft rotation joints 21a, 21b and plane rotation joints 22a, 22b, 22c of the first manipulator 20 when the distance between the first joint and the second joint is the first distance or less. Thereby, when the distance between one first joint of the plurality of shaft rotation joints 21a, 21b and plane rotation joints 22a, 22b, 22c of the first manipulator 20 and one second joint of the plurality of shaft rotation joints 21c, 21d and plane rotation joints 22d, 22e, 22f of the second manipulator 20a is the first distance or less, the velocity of the other joint than one first joint of the plurality of shaft rotation joints 21a, 21b and plane rotation joints 22a, 22b, 22c of the first manipulator 20 may be reduced.

The second control apparatus 4c includes a position and velocity calculation unit 92a.

The position and velocity calculation unit 92a calculates velocities, directions, and positions of the shaft rotation joints 21c, 21d and the plane rotation joints 22d, 22e, 22r and the distal end of the second end effector 30a from angles and velocities of the shaft rotation joints 21c, 21d and the plane rotation joints 22d, 22e, 22f of the second manipulator 20a.

Third Embodiment

Figure 5:
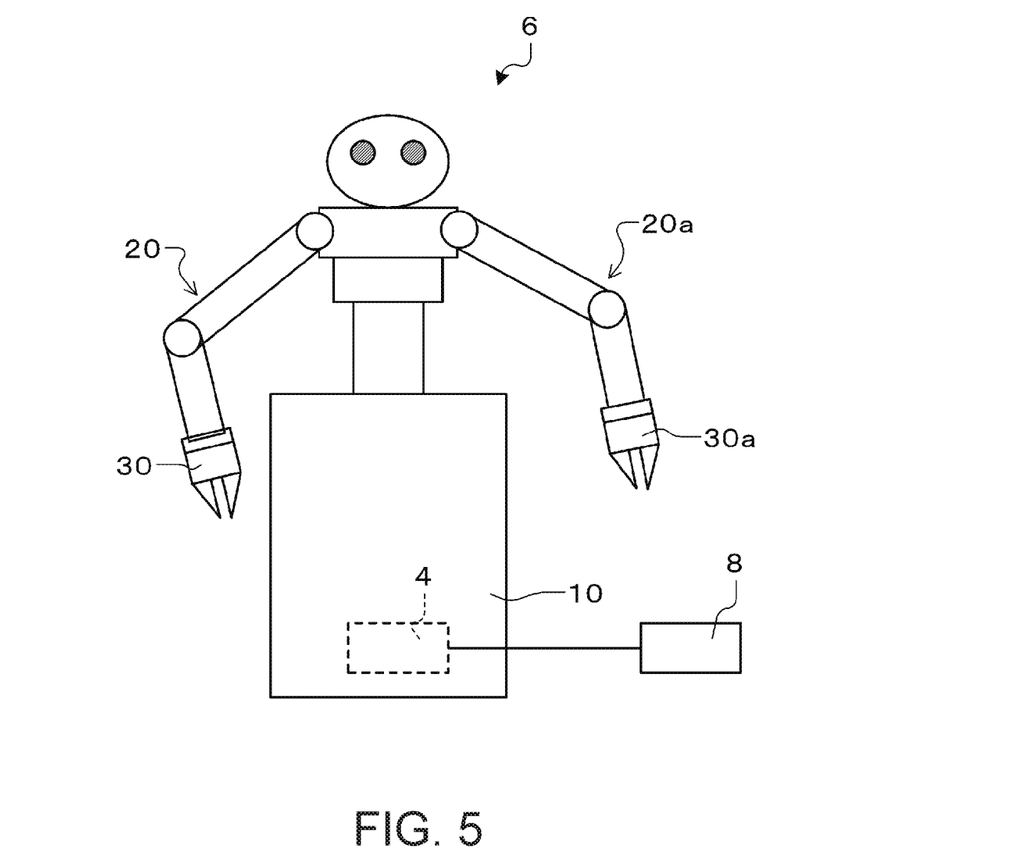
FIG. 5 is a configuration diagram showing a configuration of a robot system according to the third embodiment.
Figure 6:
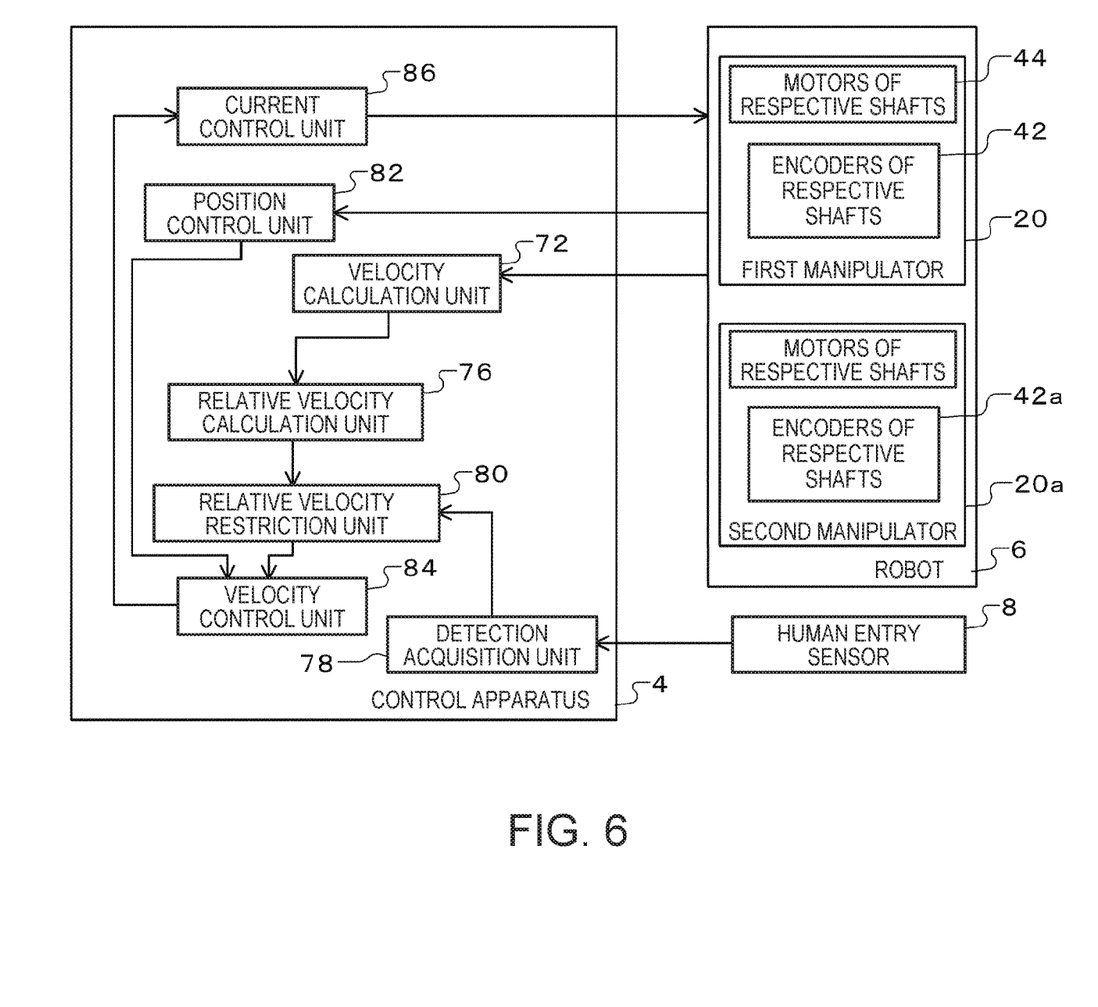
FIG. 6 is a block diagram showing the robot system according to the third embodiment.

FIG. 5 is a configuration diagram showing a configuration of a robot system according to the embodiment. FIG. 6 is a block diagram showing the robot system according to the embodiment. As below, the structure of the robot system will be explained with reference to FIGS. 5 and 6.

The second manipulator 20a of the embodiment is different from that of the first embodiment in that the second manipulator uses the base 10 and the control apparatus 4 in common with the first manipulator 20. As below, the same configurations as those of the first embodiment have the same signs and their explanation will be omitted or simplified here.

The robot 6 of the embodiment is the so-called dual-arm robot.

As shown in FIGS. 5 and 6, the robot 6 has the base 10, the first manipulator 20, the second manipulator 20a, the first end effector 30 provided on the distal end side of the first manipulator 20, and the second end effector 30a provided on the distal end side of the second manipulator 20a.

The velocity control unit 84 controls the first manipulator 20 and the second manipulator 20a. Thereby, a grasp pattern in which both of the first and second manipulators 20, 20a can grasp something at the same time is selected, and a grasping method that does not cause a failure of the next operation or the like may be determined.

Note that, in the illustrated configuration, the two arms in total are provided, however, the embodiment is not limited to that. The case where the robot has three or more arms falls within the scope of the embodiment.

In the embodiment, a human is exemplified as one of a living organism and an object, however, not limited to that. The embodiment may be widely applied to living organisms (including humans) or objects.

The embodiment is suitable for functional safety robots and dual-arm robots for coexistence with humans.

As above, the robot system of the invention is explained based on the illustrated embodiments, however, the invention is not limited to those. The configurations of the respective parts may be replaced by arbitrary configurations having the same functions. Further, other arbitrary configurations may be added thereto.

In the above described embodiments, the plane (surface) to which the robot (base) is fixed is a plane (surface) in parallel to the horizontal plane, however, the invention is not limited to that. For example, a plane (surface) inclined with respect to the horizontal plane and the vertical plane may be employed or a plane (surface) in parallel to the vertical plane may be employed. That is, the first rotation shaft may be inclined with respect to the vertical direction and the horizontal direction or parallel to the horizontal direction.

The robot of the invention is not limited to the vertical articulated robot, and the same advantages may be obtained in a horizontal articulated robot, parallel link robot, dual-arm robot, or the like. Further, the robot of the invention is not limited to the six-axis robot, and the same advantages may be obtained in a robot of seven or more axes or five or less axes. Furthermore, the robot of the invention is not limited to the manipulator robot (robot manipulator) as long as the robot has a manipulator, but may be another type of robot e.g. a legged walking (running) robot or the like.

The entire disclosures of Japanese Patent Application Nos. 2016-058113, filed Mar. 23, 2016 and 2016-195451, filed Oct. 3, 2016 are expressly incorporated by reference herein.

What is claimed is:

1. A control apparatus that controls a first manipulator, comprising:
    a detection acquisition unit that acquires information from a first detection unit detecting that at least one of a living organism and an object is located within a first range;
    a velocity acquisition unit that acquires a velocity of a second manipulator different from the first manipulator; and
    a control unit that controls a velocity of the first manipulator to be equal to or less than a first velocity,
    wherein the control unit controls the velocity of the first manipulator so that a relative velocity between the first manipulator and the second manipulator may be equal to or less than a second velocity when the detection acquisition unit acquires the information.

2. The control apparatus according to claim 1, wherein the respective velocities of the first manipulator and the second manipulator are velocities at which the first manipulator and the second manipulator move in directions closer to each other.

3. The control apparatus according to claim 1, wherein the control unit controls a velocity of a distal end of the first manipulator so that a relative velocity between the distal end of the first manipulator and a distal end of the second manipulator may be equal to or less than the second velocity when the detection acquisition unit acquires the information.

4. The control apparatus according to claim 1, further comprising a position acquisition unit that acquires a position of the second manipulator,
    wherein the control unit controls a velocity of a distal end of the first manipulator so that a relative velocity between the distal end of the first manipulator and a distal end of the second manipulator may be equal to or less than the second velocity when the detection acquisition unit acquires the information and a distance between the distal end of the first manipulator and the distal end of the second manipulator is equal to or less than a first distance.

5. The control apparatus according to claim 1, wherein the first manipulator has a joint,
    the second manipulator has a joint, and
    the control unit controls a velocity of the joint of the first manipulator so that a relative velocity between the joint of the first manipulator and the joint of the second manipulator may be equal to or less than the second velocity when the detection acquisition unit acquires the information.

6. The control apparatus according to claim 1, wherein the first manipulator has a plurality of joints,
    the second manipulator has a plurality of joints, and
    when a distance between one first joint of the plurality of joints of the first manipulator and one second joint of the plurality of joints of the second manipulator is equal to or less than a first distance, the control unit controls a velocity of the first joint so that a relative velocity between the first joint and the second joint may be equal to or less than the second velocity.

7. The control apparatus according to claim 6, wherein the control unit reduces a velocity of another joint than the one first joint of the plurality of joints of the first manipulator when the distance between the first joint and the second joint is equal to or less than the first distance.

8. The control apparatus according to claim 1, wherein the first range contains a movable range of the first manipulator.

9. The control apparatus according to claim 1, wherein the first range contains a movable range of the first manipulator and a movable range of the second manipulator.

10. The control apparatus according to claim 1, wherein the first velocity is equal to the second velocity.

11. The control apparatus according to claim 10, wherein the first velocity and the second velocity are 250 mm/s.

12. The control apparatus according to claim 1, wherein the control unit controls the first manipulator and the second manipulator.

13. A robot system comprising:
the control apparatus according to claim 1; and
a robot controlled by the control apparatus.

14. A robot system comprising:
the control apparatus according to claim 2; and
a robot controlled by the control apparatus.

15. A robot system comprising:
the control apparatus according to claim 3; and
a robot controlled by the control apparatus.

16. A robot system comprising:
the control apparatus according to claim 4; and
a robot controlled by the control apparatus.

17. A robot system comprising:
the control apparatus according to claim 5; and
a robot controlled by the control apparatus.

18. A robot system comprising:
the control apparatus according to claim 6; and
a robot controlled by the control apparatus.

19. A robot system comprising:
the control apparatus according to claim 7; and
a robot controlled by the control apparatus.

20. A robot system comprising:
the control apparatus according to claim 8; and
a robot controlled by the control apparatus.

* * * * *